UNITED STATES PATENT OFFICE.

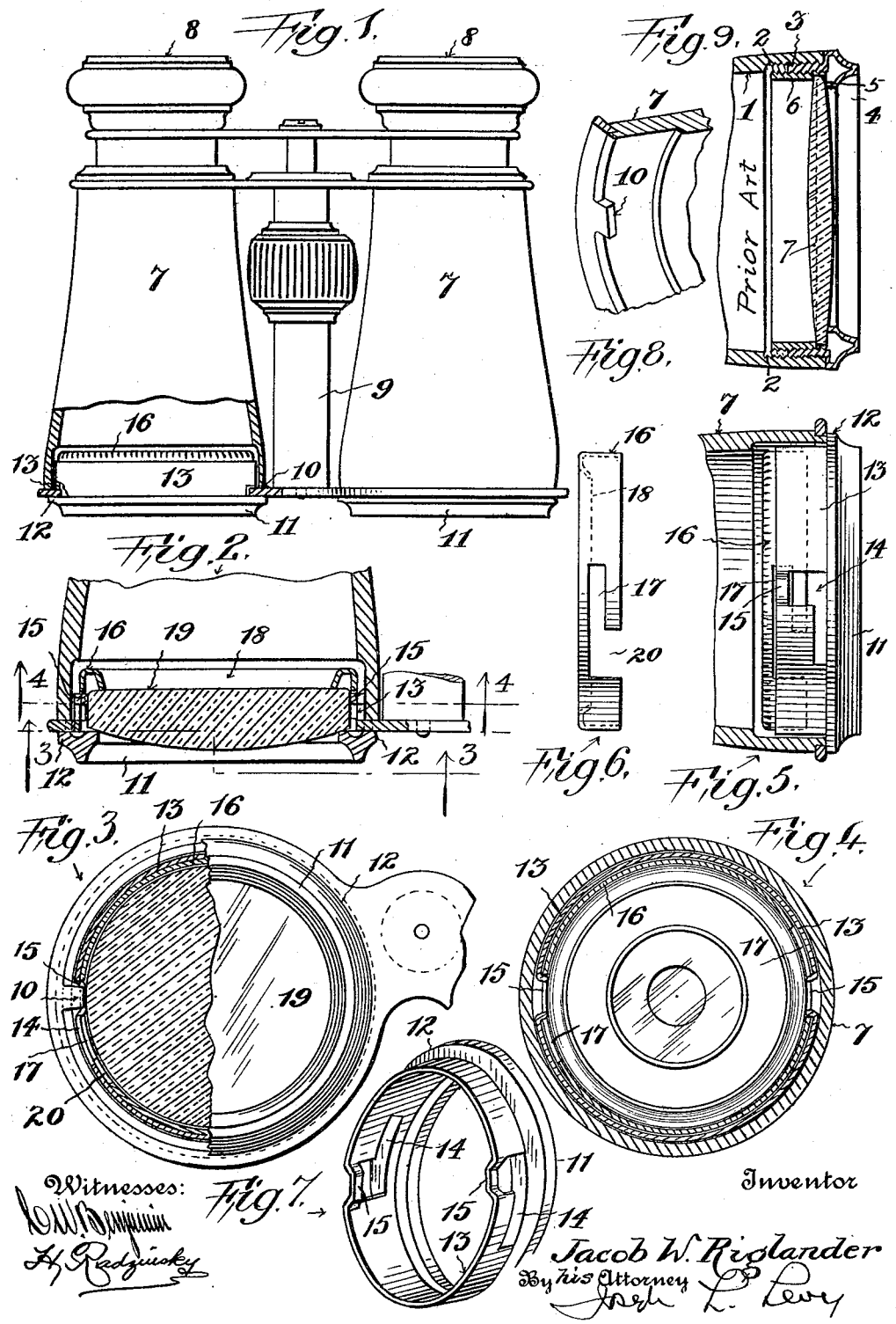

JACOB W. RIGLANDER, OF NEW YORK, N. Y.

LENS-HOLDER FOR OPTICAL INSTRUMENTS.

1,129,523.  Specification of Letters Patent.  Patented Feb. 23, 1915.

Application filed October 14, 1914. Serial No. 866,586.

*To all whom it may concern:*

Be it known that I, JACOB W. RIGLANDER, a citizen of the United States, residing in the city and county of New York, State of New York, and whose post-office address is 49 Maiden Lane, in said city, have invented certain new and useful Improvements in Lens-Holders for Optical Instruments, of which the following is a specification.

My invention relates to devices for holding a lens in an optical instrument, such as opera glasses, telescopes, photographic lenses, microscopes, and the like.

The object of my invention is to simplify the means by which lenses are held in place in such instrument, to increase the facility of their attachment or detachment, and to cheapen the cost of the holding device.

My invention, in its broad aspect, comprehends a holder comprising two parts, a bayonet joint or like means for detachably securing the parts of the holder together, and holding the lens between the parts, and a like joint formed between the body and the optical instrument and on one of the holder parts.

My invention, therefore, resides in the construction and combination of parts hereinafter described and further pointed out in the claims.

In the drawing forming part of this specification here described, Figure 1 is a side elevation, partly in section, of a pair of opera glasses provided with my improvement; Fig. 2 is an enlarged sectional elevation of the end of one of the barrels of the opera glasses; Fig. 3 is a sectional view on the line 3—3 of Fig. 2, looking in the direction of the arrows; Fig. 4 is a sectional view on the line 4—4 of Fig. 2, looking in the direction of the arrows; Fig. 5 is a sectional view of one of the barrels of the opera glasses, showing my improved lens holder in position; Fig. 6 is a side elevation of an annular ring showing the bayonet joint groove; Fig. 7 is a perspective view of the ring which holds the lens; Fig. 8 shows a portion of an end of one of the opera glass barrels, showing one of the lugs on its interior; and Fig. 9 is a sectional view of a portion of an opera glass or like instrument, showing the old method of securing lenses therein.

Similar reference characters designate similar parts throughout the several views of the drawings.

While I have shown my invention as embodied in an opera glass, it is clear that it may be used in any connection where a lens holder is required, with simple modifications to make it fit particular environments. It will also be noted that the holder may be employed in holding the lens for the eye-piece as well as the objective of such optical instruments, as opera glasses and the like.

I shall first describe the old or conventional method of making lens holders. At 1 is the tubular body of the opera glass, etc., which is interiorly threaded at 2. 3 is an outer ring which is exteriorly and interiorly threaded, and having an annular projection 4, said projection having a shoulder 5. At 6 is an annular ring, exteriorly threaded to engage the interior thread on the ring 3. The lens 7 is held against the edge of the ring 6 by the shoulder 5 of the ring 3. The formation of these threads on the ring 3 and the construction of the ring 6 with its corresponding thread is an expensive element in the construction of lens holders, and as the ring 6 must necessarily be comparatively thin, the operation of forming these threads is attended with considerable waste. Considerable nicety of workmanship must be exercised in fitting the parts together, so that they may be readily assembled or taken apart. In order to secure proper fitting, the threads have to be formed very close, which results in considerable waste of time in screwing and unscrewing the parts. All these features of construction tend to enhance the cost of the resultant article, which is a very material consideration in connection with opera glasses, telescopes and the like, which are to be sold at a very reasonable price.

My improvements overcome these difficulties.

The opera glasses shown herein have the usual barrels 7, eye pieces 8 and adjusting rod 9. On the interior of the barrels adjacent their ends are lugs 10.

The lens holder comprises an annular ring 11, having a lip 12 adapted to bear against the front of the opera glass barrel, and a wall 13 in which are bayonet like grooves 14. Above these grooves a portion of the wall 13 is bent inwardly to form lugs 15.

Fitting on the interior of the wall 13, of the ring 11 is another annular ring 16 in which are bayonet like grooves 17 and an inwardly bent lip 18.

The lens 19 is fitted into the holder 11 by slipping the same into the wall 13 of the annular rings 11, the lugs 15 pressing tightly against the sides of the lens and holding it in position.

The ring 16 fits between the sides of lens 19 and the wall 13. In placing the same in position, the lugs 15 are slid through the openings 20 in the bayonet groove 17, in the ring 16. The ring 16 is then revolved and the lugs 15 are thus brought around into the narrow portion of the groove 17 thus holding the two rings and lens closely together. The lens and its holder are then slipped into the front of the opera glass barrel, the lugs 10 passing through the bent-in sides of the lugs 15, and the entire lens-holding device is then revolved slightly, bringing the lugs 10 into the narrow portion of the bayonet grooves 14 and thus holding the entire lens-holding device in position.

To remove the lens-holding device for the purpose of cleaning the lens or for any other purpose, the lens-holding device is simply revolved backward until the lugs 10 come into line with the bent-in portions of the lugs 15, and then the entire lens-holding device is drawn out.

It is clear that my invention may be variously embodied and that I am not limited to the specific and exact construction shown, and this without departing from the spirit of the invention, as set forth in the claims appended hereto.

I claim:

1. In an optical instrument, the combination with an instrument body and a lens holder comprising an outer ring and an inner ring, a bayonet joint connection between the outer and the inner rings, the lens held between the inner and outer rings, and the bayonet joint connection formed between the outer ring and the body of the instrument.

2. In an optical instrument, the combination with an instrument body, and a lens-holder comprising an outer ring, an inner ring, lugs on said outer ring adapted to move in grooves on said inner ring and hold both of said rings together with the lens between them, and means for securing said rings and lens to an optical instrument.

3. In an optical instrument, the combination with an instrument body, an outer ring for receiving a lens, an inner ring, grooves in said inner ring, lugs and grooves on the outer ring, the lugs on the outer ring adapted to move in the grooves in the inner ring and lugs on the instrument body adapted to move in the grooves on the outer ring and secure the same to the instrument body.

4. In an optical instrument, the combination with an instrument body, a lens-holder comprising an annular ring having walls, bayonet-like grooves in said walls and lugs formed above said grooves, a ring with bayonet-like grooves adapted to fit within the walls of said first-mentioned ring and hold a lens between it and said ring, lugs on the instrument body adapted to move in the bayonet grooves in the first mentioned ring and hold both rings and lens in position.

Signed in the city, county and State of New York, this 9th day of October, 1914.

JACOB W. RIGLANDER.

Witnesses:
M. J. STRAUS,
CHAS. E. SCHMIDT.

Copies of this patent may be obtained for five cents each, by addressing the "Commissioner of Patents, Washington, D. C."